(12) United States Patent
Umesh et al.

(10) Patent No.: US 8,169,905 B2
(45) Date of Patent: May 1, 2012

(54) PACKET COMMUNICATION METHOD AND RECEIVING-SIDE APPARATUS

(75) Inventors: Anil Umesh, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 240 days.

(21) Appl. No.: 12/594,897

(22) PCT Filed: Apr. 7, 2008

(86) PCT No.: PCT/JP2008/056872
§ 371 (c)(1),
(2), (4) Date: Jan. 7, 2010

(87) PCT Pub. No.: WO2008/126822
PCT Pub. Date: Oct. 23, 2008

(65) Prior Publication Data
US 2010/0118780 A1    May 13, 2010

(30) Foreign Application Priority Data

Apr. 6, 2007 (JP) ................................ P2007-101193

(51) Int. Cl.
*H04L 12/26* (2006.01)
(52) U.S. Cl. ....................................... 370/231
(58) Field of Classification Search .......... None
See application file for complete search history.

(56) References Cited

U.S. PATENT DOCUMENTS

| | | | | |
|---|---|---|---|---|
| 6,208,620 B1 * | 3/2001 | Sen et al. | | 370/231 |
| 7,558,240 B2 * | 7/2009 | Chen et al. | | 370/338 |
| 2004/0037224 A1 | 2/2004 | Choi et al. | | |
| 2005/0135329 A1 * | 6/2005 | Lee et al. | | 370/349 |
| 2006/0153237 A1 * | 7/2006 | Hwang et al. | | 370/469 |

FOREIGN PATENT DOCUMENTS

| | | |
|---|---|---|
| EP | 1 643 690 A1 | 4/2006 |
| JP | 2000-134263 A | 5/2000 |
| JP | 2001-036585 A | 2/2001 |
| JP | 2003-500925 A | 1/2003 |
| JP | 2003-283596 A | 10/2003 |
| JP | 2007-028653 A | 2/2007 |
| RU | 2251219 C2 | 4/2005 |
| WO | 00/72518 A1 | 11/2000 |
| WO | 03058852 A1 | 7/2003 |
| WO | 2005/076688 A2 | 8/2005 |
| WO | 2005/117317 A1 | 12/2005 |
| WO | 2005/125125 A1 | 12/2005 |

OTHER PUBLICATIONS

Office Action in Japanese Patent Application No. 2009-509338 mailed Nov. 9, 2010, with English translation thereof (3 pages).

(Continued)

*Primary Examiner* — Raj Jain
(74) *Attorney, Agent, or Firm* — Osha Liang LLP (57) ABSTRACT

A packet communication method according to the present invention includes the steps of: starting, at a predetermined sublayer of a receiving-side apparatus, a reordering timer, when receiving a second packet before receiving a first packet in a case where a sequence number of the first packet is smaller than a sequence number of the second packet; and transmitting, at the predetermined sublayer of the receiving-side apparatus, a retransmission request for the first packet, when not receiving the first packet until the reordering timer expires.

28 Claims, 9 Drawing Sheets

OTHER PUBLICATIONS

Japanese Office Action for Application No. 2009-509338, mailed on Jul. 13, 2010 (5 pages).
Samsung Electronics, Reordering for in Sequence Delivery, 3GPP TSG RAN WG2 #22 R2-011601, Jul. 2001, URL, http://www.3gpp.org/ftp/tsg_ran/WG2_RL2/TSGR2_22/Docs/Zips/R2-011601.zip.
Patent Abstracts of Japan for Japanese Publication No. 2003-283596, publication date Oct. 3, 2003 (1 page).
NTT DoCoMo, et al., "MAC reordering for LTE," 3GPP TSG RAN WG2 Meeting #55, R2-062907, Oct. 2006, 2 pages.
Siemens, "ARQ operation and HARQ," 3GPP TSG-RAN WG2 #55, R2-062843, Oct. 2006, 4 pages.
3GPP TS 36.300 V8.0.0 (Mar. 2007), "Evolved Universal Terrestrial Radio Access (E-UTRA) and Evolved Universal Terrestrial Radio Access Network (E-UTRAN)," 82 pages.
3GPP TS 25.322 V6.9.0 (Sep. 2006), "Radio Link Control (RLC) protocol specification," 86 pages.
International Search Report issued in PCT/JP2008/056872, mailed on Jun. 10, 2008, with translation, 4 pages.
Written Opinion issued in PCT/JP2008/056872, mailed on Jun. 10, 2008, 4 pages.
Russian Office Action for Application No. 2009138303/08, mailed on Nov. 21, 2011 (9 pages).

* cited by examiner

STATUS-PDU (NACK)

| 0 | 1 | 2 | 3 | 4 | 5 | 6 | 7 |
|---|---|---|---|---|---|---|---|
| Type | | | Control PDU Type | | | Reserve | |
| Selective NACK SN | | | | | | | |
| Selective NACK First Octet | | | | | | | |
| Selective NACK Last Octet | | | | | | | |
| Selective NACK First Octet | | | | | | Reserve | |
| Selective NACK Last Octet | | | | | | Reserve | |
| Selective NACK SN | | | | | | | |
| Selective NACK First Octet | | | | | | | |
| Selective NACK Last Octet | | | | | | | |
| Selective NACK First Octet | | | | | | Reserve | |
| Selective NACK Last Octet | | | | | | Reserve | |

PACKET COMMUNICATION METHOD AND RECEIVING-SIDE APPARATUS

TECHNICAL FIELD

The present invention relates to a packet communication method in which a sublayer of a transmitting-side apparatus transmits a packet with a given sequence number to a sublayer of a receiving-side apparatus, and also to the receiving-side apparatus.

BACKGROUND ART

In 3GPP, which is an organization that sets standards for third generation mobile communications systems, a study collectively termed as LTE (Long Term Evolution) has been conducted for achieving a drastic improvement of transmission speed and reduction of transmission delay in a radio access network (RAN); and formulation of standard specifications of the elemental technologies related to the study has been in progress.

Figure 4:
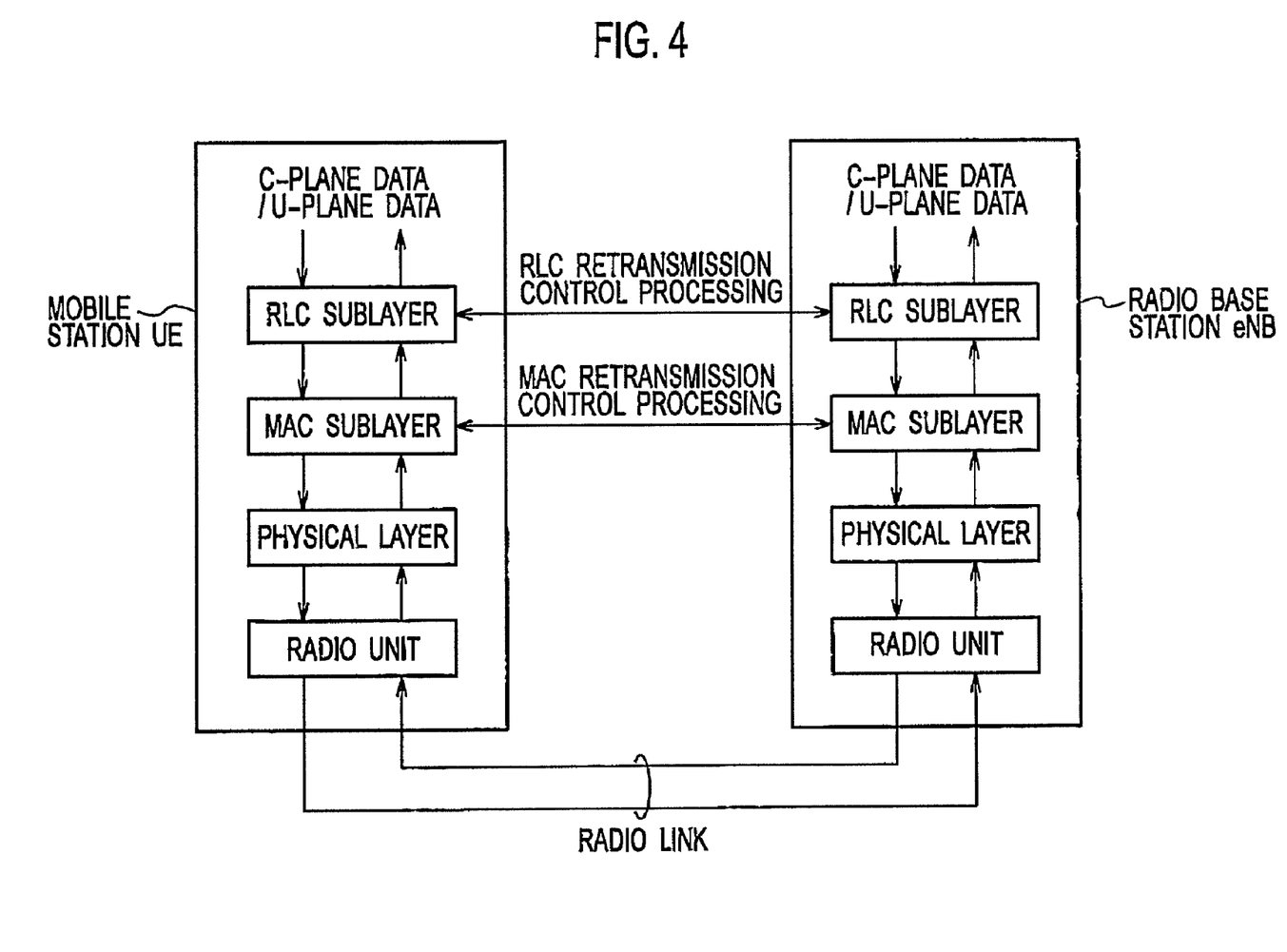
FIG. 4 is a diagram showing a protocol layer configuration in a radio access network of a mobile communication system according to a first embodiment of the present invention.

As shown in FIG. 4, the radio access network (E-UTRAN: Evolved Universal Terrestrial RAN) in an LTE mobile communication system is configured of a mobile station UE (User Equipment) and a radio base station eNB (E-UTRAN Node B). This system is configured in such a way that the mobile station UE and the radio base station eNB communicate with each other via a radio link (RL).

Moreover, each of the mobile station UE and the radio base station eNB is configured to terminate an RLC (Radio Link Control) sublayer, a MAC (Medium Access Control) sublayer and a physical (PHY: Physical) layer.

In addition, a transmitting-side apparatus (mobile station UE or radio base station eNB) is configured to perform RLC processing, MAC processing and PHY processing sequentially for data to be transmitted and then to transmit the data as radio signals from a radio unit.

Meanwhile, a receiving-side apparatus (mobile station UE or radio base station eNB) is configured to extract the transmitted data by performing PHY processing, MAC processing and RLC processing sequentially for the radio signals received by a radio unit.

Here, the data to be transmitted includes user data (U-plane data) generated by an application or the like used by the user, and control data (C-plane data) used in controlling the mobile communication system, such as RRC (Radio Resource Control) signaling and NAS (Non Access Stratum) signaling.

Moreover, this system is configured in such a way that RLC retransmission control processing is performed between the RLC sublayer of the transmitting-side apparatus and the RLC sublayer of the receiving-side apparatus, and that HARQ (Hybrid Automatic Repeat Request) retransmission control processing (MAC retransmission control processing) is performed between the MAC sublayer of the transmitting-side apparatus and the MAC sublayer of the receiving-side apparatus.

Figure 1:
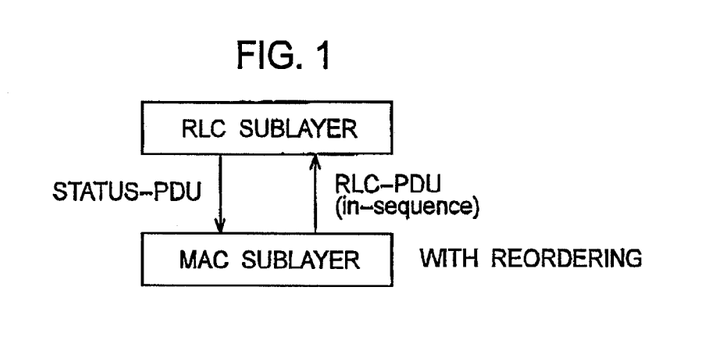
FIG. 1 is a diagram for describing an operation in a receiving-side apparatus of a conventional mobile communication system.

Here, in an IMT-2000 mobile communication system, a receiving-side apparatus is configured so that the MAC sublayer performs reordering processing for received RLC-PDUs (actually, MAC-PDUs to which the RLC-PDUs are mapped), and then transmits the RLC-PDUs to the RLC sublayer in the order of the sequence numbers, as shown in FIG. 1.

Figure 2:
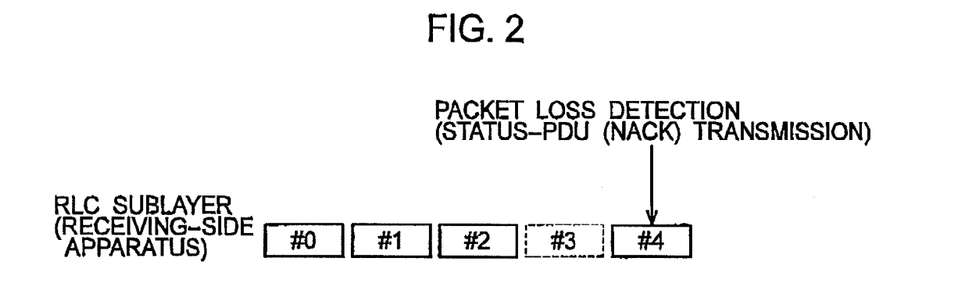
FIG. 2 is a diagram for describing an operation in the receiving-side apparatus of the conventional mobile communication system.

Accordingly, the RLC sublayer is configured to unconditionally determine that a packet loss has occurred, when receiving an RLC-data-PDU of a sequence number #4 before receiving an RLC-data-PDU (AMD-PDU in an IMT-2000 mobile communication system) of a sequence number #3, and to transmit a STATUS-PDU (NACK) that requests retransmission of the RLC-data-PDU of the sequence number #3, as shown in FIG. 2.

Non-Patent Document 1: RLC Specification of IMT-2000: 3GPP TS 25.322 V6.9.0 (2006-09)
Non-Patent Document 2: LTE Stage 2 Specification: 3GPP TS 36.300 V8.0.0 (2007-03)

DISCLOSURE OF THE INVENTION

Figure 3:
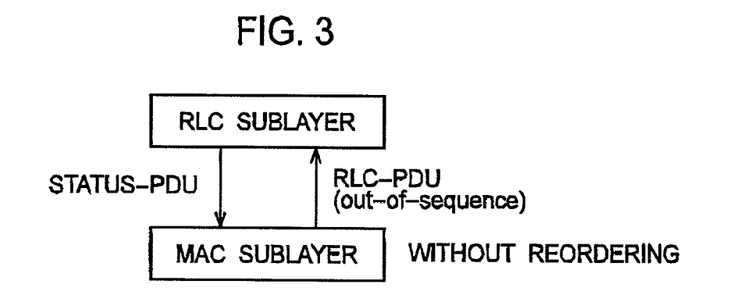
FIG. 3 is a diagram for describing an operation in the receiving-side apparatus of the conventional mobile communication system.

However, in the LTE mobile communication system, as shown in FIG. 3, a MAC sublayer is configured to transmit an RLC-PDU to an RLC sublayer without performing reordering processing for received RLC-PDUs in a receiving-side apparatus.

Accordingly, in the LTE mobile communication system, it is impossible to unconditionally determine that a packet loss has occurred, even when the RLC-data-PDU of the sequence number #4 is received before the RLC-data-PDU of the sequence number #3 is received, unlike in the case of the IMT-2000 mobile communication system.

In this respect, the present invention has been made in view of the aforementioned problem. An object of the present invention is to provide a packet communication method and a receiving-side apparatus that enable an RLC sublayer to appropriately detect an occurrence of a packet loss in a case where a MAC sublayer does not perform reordering processing for received RLC-PDUs.

A first aspect of the present invention is summarized as a packet communication method in which a predetermined sublayer of a transmitting-side apparatus transmits a packet with a given sequence number to a predetermined sublayer of a receiving-side apparatus, the method including the steps of: starting, at the predetermined sublayer of the receiving-side apparatus, a reordering timer, when receiving a second packet before receiving a first packet in a case where a sequence number of the first packet is smaller than a sequence number of the second packet; and transmitting, at the predetermined sublayer of the receiving-side apparatus, a retransmission request for the first packet, when not receiving the first packet until the reordering timer expires.

In the first aspect, the predetermined sublayer of the receiving-side apparatus can start the reordering timer, when receiving the second packet before receiving a plurality of the first packets; and the predetermined sublayer of the receiving-side apparatus can transmit a retransmission request for the unreceived first packet, when not receiving all of the plurality of the first packets until the reordering timer expires.

In the first aspect, the first and second packets can be transmitted via a logical channel established between the predetermined sublayer of the transmitting-side apparatus and the predetermined sublayer of the receiving-side apparatus; and the reordering timer can be set for each of the logic channels.

In the first aspect, the receiving-side apparatus can be notified of a setting value of the reordering timer by an RRC (Radio Resource Control) message.

A second aspect of the present invention is summarized as a packet communication method in which a predetermined sublayer of a transmitting-side apparatus transmits a packet with a given sequence number to a predetermined sublayer of a receiving-side apparatus, the method including the steps of: starting, at the predetermined sublayer of the receiving-side apparatus, a reordering timer, when receiving a second packet before receiving a first packet in a case where a sequence number of the first packet is smaller than a sequence number of the second packet; and determining, at the predetermined sublayer of the receiving-side apparatus, that there is no chance to receive the first packet, when not receiving the first packet until the reordering timer expires; wherein the first and second packets are transmitted via a logical channel established between the predetermined sublayer of the transmitting-side apparatus and the predetermined sublayer of the receiving-side apparatus; and the reordering timer is set for each of the logic channels.

In the second aspect, the predetermined sublayer of the receiving-side apparatus can start the reordering timer, when receiving the second packet before receiving a plurality of the first packets; and the predetermined sublayer of the receiving-side apparatus can determine that there is no chance to receive the unreceived first packet, when not receiving all of the plurality of the first packets until the reordering timer expires.

In the second aspect, the predetermined sublayer of the receiving-side apparatus can manage a receive window that defines an upper limit value and a lower limit value of a sequence number of a receivable packet; and the predetermined sublayer of the receiving-side apparatus can set the lower limit value of the receive window to a value larger than the sequence number of the first packet, when determining that there is no chance to receive the first packet.

In the second aspect, the receiving-side apparatus can be notified of a setting value of the reordering timer by an RRC (Radio Resource Control) message.

A third aspect of the present invention is summarized as a receiving-side apparatus configured to receive a packet with a given sequence number from a predetermined sublayer of a transmitting-side apparatus, wherein the predetermined sublayer of the receiving-side apparatus is configured to start a reordering timer, when receiving a second packet before receiving a first packet in a case where a sequence number of the first packet is smaller than a sequence number of the second packet; and the predetermined sublayer of the receiving-side apparatus is configured to transmit a retransmission request for the first packet, when not receiving the first packet until the reordering timer expires.

In the third aspect, the predetermined sublayer of the receiving-side apparatus can be configured to start the reordering timer, when receiving the second packet before receiving a plurality of the first packets, and the predetermined sublayer of the receiving-side apparatus can be configured to transmit a retransmission request for the unreceived first packet, when not receiving all of the plurality of the first packets until the reordering timer expires, In the third aspect, the first and second packets can be configured to be transmitted via a logical channel established with the predetermined sublayer of the transmitting-side apparatus, and the reordering timer can be configured to be set for each of the logic channels.

In the third aspect, a setting value of the reordering timer can be notified by an RRC (Radio Resource Control) message.

A fourth aspect of the present invention is summarized as a receiving-side apparatus configured to receive a packet with a given sequence number from a predetermined sublayer of a transmitting-side apparatus, wherein the predetermined sublayer of the receiving-side apparatus is configured to start a reordering timer, when receiving a second packet before receiving a first packet in a case where a sequence number of the first packet is smaller than a sequence number of the second packet; the predetermined sublayer of the receiving-side apparatus is configured to determine that there is no chance to receive the first packet when not receiving the first packet until the reordering timer expires; the first and second packets are configured to be transmitted via a logical channel established with the predetermined sublayer of the transmitting-side apparatus; and the reordering timer is configured to be set for each of the logic channels.

In the fourth aspect, the predetermined sublayer of the receiving-side apparatus can be configured to start the reordering timer, when receiving the second packet before receiving a plurality of the first packets; and the predetermined sublayer of the receiving-side apparatus can be configured to determine that there is no chance to receive the unreceived first packet, when not receiving all of the plurality of the first packets until the reordering timer expires.

In the fourth aspect, the predetermined sublayer of the receiving-side apparatus can be configured to manage a receive window that defines an upper limit value and a lower limit value of a sequence number of a receivable packet; and the predetermined sublayer of the receiving-side apparatus can be configured to set the lower limit value of the receive window to a value larger than the sequence number of the first packet, when determining that there is no chance to receive the first packet.

In the fourth aspect, a setting value of the reordering timer can be notified by an RRC (Radio Resource Control) message.

As described above, according to the present invention, it is possible to provide a packet communication method and a receiving-side apparatus that enable an RLC sublayer to appropriately detect an occurrence of a packet loss in a case where a MAC sublayer does not perform reordering processing for received RLC-PDUs.

BEST MODE FOR CARRYING OUT THE INVENTION (Configuration of Mobile Communication System According to First Embodiment of the Present Invention)

A description will be given of a configuration of a mobile communication system according to a first embodiment of the present invention with reference to FIGS. 4 to 8.

Note that, in this embodiment, the description will be given of a mobile communication system including an LTE/SAE (System Architecture Evolution) architecture for which standardization by 3GPP has been in progress, as an example, as shown in FIG. 4, but the present invention is not limited to the mobile communication system, and is applicable to a mobile communication system including another architecture.

A description will be given of a functional configuration of an RLC sublayer of Acknowledge mode (AM) (hereinafter, referred to as RLC sublayer) with reference to FIG. 5.

Figure 5:
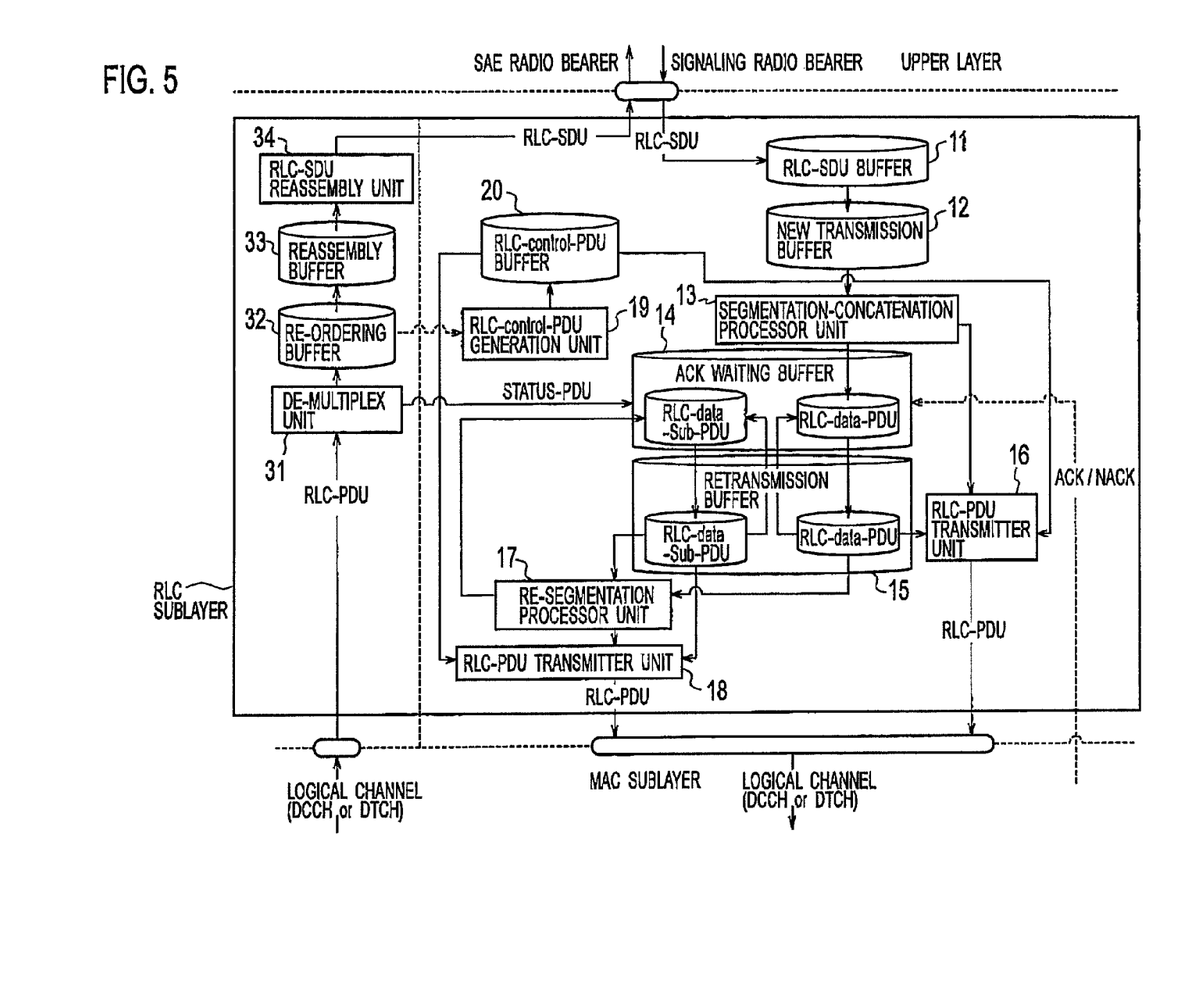
FIG. 5 is a functional block diagram of an RLC sublayer in a mobile station and a radio base station according to the first embodiment of the present invention.

Note that, a part of or all of the functions (modules) constituting the RLC sublayer shown in FIG. 5 may be implemented by hardware or software on an IC chip.

For example, on an IC chip, functions (modules) constituting a MAC sublayer and a physical layer for which simple and high speed processing is generally required may be configured to be implemented by hardware, and functions (modules) constituting the RLC sublayer for which complex processing is generally required may be configured to be implemented by software.

In addition, a function (module) constituting the physical layer, a function (module) constituting the MAC sublayer and a function (module) constituting the RLC sublayer may be implemented on the same IC chip, or may be implemented on different IC chips, respectively.

Hereinafter, an example of a configuration of the RLC sublayer in the mobile communication system according to this embodiment will be shown with reference to FIG. 5.

As shown in FIG. 5, the RLC sublayer includes an RLC-SDU buffer 11, a new transmission buffer 12, a segmentation-concatenation processor unit 13, an ACK waiting buffer 14, a retransmission buffer 15, an RLC-PDU transmitter unit 16, a re-segmentation processor unit 17, an RLC-PDU transmitter unit 18, an RLC-control-PDU generation unit 19, an RLC-control-PDU buffer 20, a de-multiplex unit 31, a reordering buffer 32, a reassembly buffer 33 and an RLC-SDU reassembly unit 34.

The RLC-SDU buffer 11 is configured to store an RLC-SDU received from an upper layer therein.

The new transmission buffer 12 is configured to copy the RLC-SDU stored in the RLC-SDU buffer 11, and then to store the RLC-SDU therein.

The segmentation-concatenation processor unit 13 is configured to perform segmentation processing or concatenation processing for the RLC-SDU (or a part thereof) stored in the new transmission buffer 12, and thereby to generate an RLC-data-PDU whose size becomes the largest within a range of an allowable amount of transmission data notified from a MAC sublayer along with a notification, in a case where a data transmission event is notified by the MAC sublayer.

In addition, the segmentation-concatenation processor unit 13 is configured to transmit the generated RLC-data-PDU to the RLC-PDU transmitter unit 16, and also to cause the generated RLC-data-PDU to be stored in the ACK waiting buffer 14.

The ACK waiting buffer 14 is configured to store, therein, the RLC-data-PDU from the segmentation-concatenation processor unit 13, an RLC-data-PDU or an RLC-data-Sub-PDU from the retransmission buffer 15, and an RLC-data-Sub-PDU from the re-segmentation processor unit 17.

The ACK waiting buffer 14 is configured to determine whether or not retransmission for the stored RLC-data-PDU or RLC-data-Sub-PDU is necessary, and to transmit, to the retransmission buffer 15, the RLC-data-PDU or RLC-data-Sub-PDU for which a determination is made that retransmission thereof is necessary.

Here, for example, the ACK waiting buffer 14 determines whether or not it is necessary for the stored RLC-data-PDU or RLC-data-Sub-PDU to be retransmitted, in a case where a STATUS-PDU (NACK) from the RLC sublayer and in a case where a NACK from the MAC sublayer of the receiving-side apparatus are received.

Figure 7:
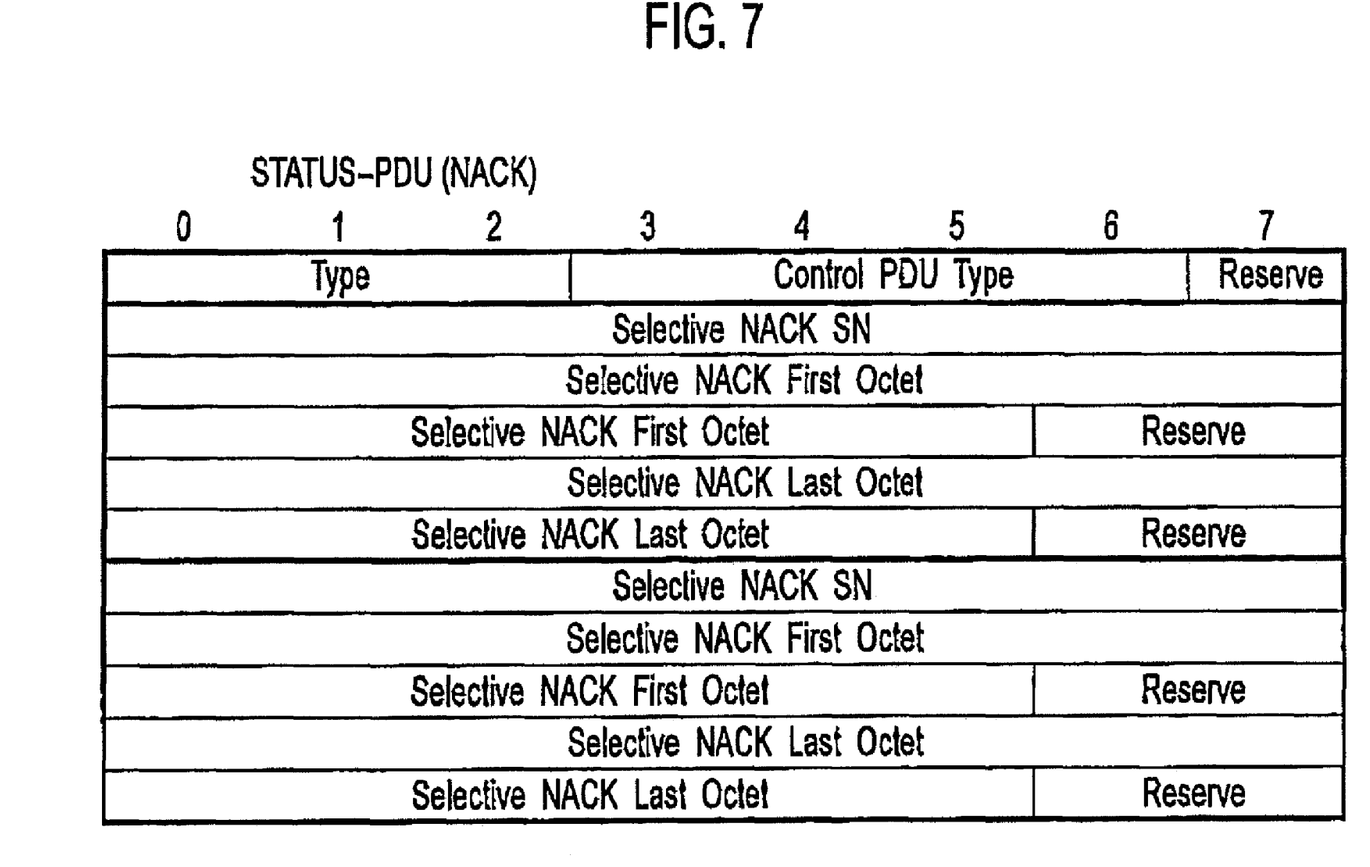
FIG. 7 is a diagram showing an example of a format of a STATUS-PDU to be generated by an RLC sublayer in a mobile station and a radio base station according to the first embodiment of the present invention.

In FIG. 7, a format example of a STATUS-PDU (NACK) used in the mobile communication system according to the present embodiment is shown.

As shown in FIG. 7, the STATUS-PDU (NACK) includes a "Type" field, a "Control PDU Type" field, a "Selective NACK SN" field, a "Selective NACK First Octet" field and a "Selective NACK Last Octet" field.

Here, a payload portion of the STATUS-PDU (NACK) may include multiple sets of "Selective NACK SN" fields, "Selective NACK First Octet" fields and "Selective NACK Last Octet" fields.

The "Control PDU Type" field is a field showing a type of the RLC-control-PDU. For example, as a type of the RLC-control-PDU, a STATUS-PDU (ACK) or a STATUS-PDU (NACK) or the like is assumed.

The "Selective NACK SN" field is a field showing a sequence number of the RLC-data-PDU for which RLC retransmission has been determined to be necessary in a receive window of the RLC sublayer of the receiving-side apparatus.

The "Selective NACK First Octet" field is a field showing that from which byte (octet) in the RLC-data-PDU specified by the "Selective NACK SN" field needs to be retransmitted.

The "Selective NACK Last Octet" field is a field showing that up to which byte (octet) in the RLC-data-PDU specified by the "Selective NACK SN" field needs to be retransmitted.

The retransmission buffer 15 is configured to store an RLC-data-PDU or an RLC-data-Sub-PDU from the ACK waiting buffer 14 therein.

The RLC-PDU transmitter unit 16 is configured to transmit, to the MAC sublayer, the RLC-data-PDU transmitted from the segmentation-concatenation processor unit 13 and the RLC-data-PDU stored in the retransmission buffer 15, in a case where a data transmission event is notified from the MAC sublayer.

Here, the RLC-PDU transmitter unit 16 may be configured to generate an RLC-data-PDU-piggybacked-control-PDU, by adding the RLC-control-PDU (STATUS-PDU or the like) stored in the RLC-control-PDU buffer 20 to the RLC-data-PDU to be transmitted, and then to transmit the RLC-data-PDU-piggybacked-control-PDU.

Note that, the RLC-PDU transmitter unit 16 is configured to transmit an RLC-PDU via a logical channel established with the RLC sublayer of the receiving-side apparatus.

The re-segmentation processor unit 17 is configured to generate multiple RLC-data-Sub-PDUs by segmenting one RLC-data-PDU or RLC-data-Sub-PDU stored in the retransmission buffer 15 in accordance with the communication state of the radio link, that is, in accordance with the allowable amount of transmission data notified by the MAC layer along with the notification. Specifically, the re-segmentation processor unit 17 is configured to perform re-segmentation processing for the RLC-data-PDU or the RLC-data-Sub-PDU stored in the retransmission buffer 15.

Figure 6:
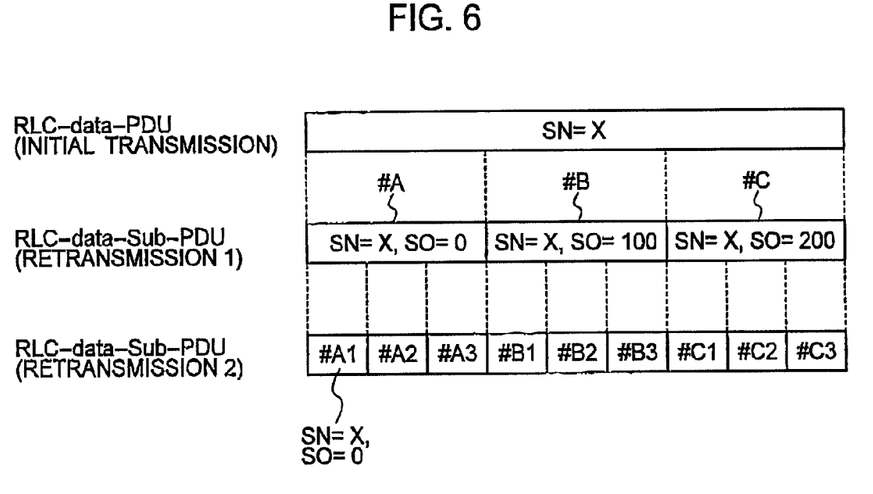
FIG. 6 is a diagram for describing re-segmentation processing to be performed in the RLC sublayer in a mobile station and a radio base station according to the first embodiment of the present invention.

In an example in FIG. 6, the re-segmentation processor unit 17 segments an RLC-data-PDU (SN=x) into three RLC-data-Sub-PDUs #A to #C at the first retransmission, and segments the three RLC-data-Sub-PDUs #A to #C into three RLC-data-Sub-PDUs #A1 to #A3, #B1 to #B3 and #C1 to #C3, respectively.

The RLC-PDU transmitter unit 18 is configured to transmit, to the MAC sublayer, the RLC-data-Sub-PDU that has been subjected to the re-segmentation processing by the re-segmentation processor unit 17, in a case where a data transmission event is notified from the MAC sublayer.

Here, the RLC-PDU transmitter unit 18 may be configured to generate an RLC-data-Sub-PDU-piggybacked-control-PDU, by adding the RLC-control-PDU (STATUS-PDU or the like) stored in the RLC-control-PDU buffer 20 to the RLC-data-Sub-PDU to be transmitted, and to transmit the RLC-data-Sub-PDU-piggybacked-control-PDU.

The RLC-control-PDU generation unit 19 is configured to generate a STATUS-PDU (ACK/NACK) in accordance with a notification from the reordering buffer 32.

The RLC-control-PDU buffer 20 is configured to store the RLC-control-PDU generated by the RLC-control-PDU generation unit 19.

The de-multiplex unit 31 is configured to extract a STATUS-PDU from the RLC-PDU received from the MAC sublayer, and then to forward the STATUS-PDU to the ACK waiting buffer 14, and also to extract and then to forward an RLC-data-PDU and an RLC-data-Sub-PDU to the reordering buffer 32.

Note that, the MAC sublayer is configured to transmit an RLC-PDU to the RLC sublayer without performing reordering processing as described above.

The reordering buffer 32 is configured to perform the reordering processing for the stored RLC-data-PDU (or RLC-data-Sub-PDU).

In addition, the reordering buffer 32 is configured to manage a receive window that defines the upper limit value ("VR (MR)") and the lower limit value ("VR(R)") of the sequence number of a receivable packet.

Specifically, the reordering buffer 32 is configured to cause RLC-data-PDUs (in-sequence) stored (in consideration of modulo operation) in the order of the sequence numbers to be stored in the reassembly buffer 33.

Meanwhile, the reordering buffer 32 is configured to perform RLC-data-PDU loss detection processing using a reordering timer for an RLC-data-PDU (out-of-sequence) not stored (in consideration of modulo operation) in the order of the sequence numbers. The reordering buffer 32 is configured to notify the RLC-control-PDU generation unit 19 that a loss is detected for an unreceived RLC-data-PDU, in a case where such a loss is detected.

The reordering buffer 32 is configured to start the reordering timer, when receiving a second packet before receiving a first packet in a case where the sequence number of the first packet is smaller than the sequence number of the second packet. Here, "in a case where the sequence number of the first packet is smaller than the sequence number of the second packet" refers to a comparison result at the stage before modulo operation.

Figure 8:
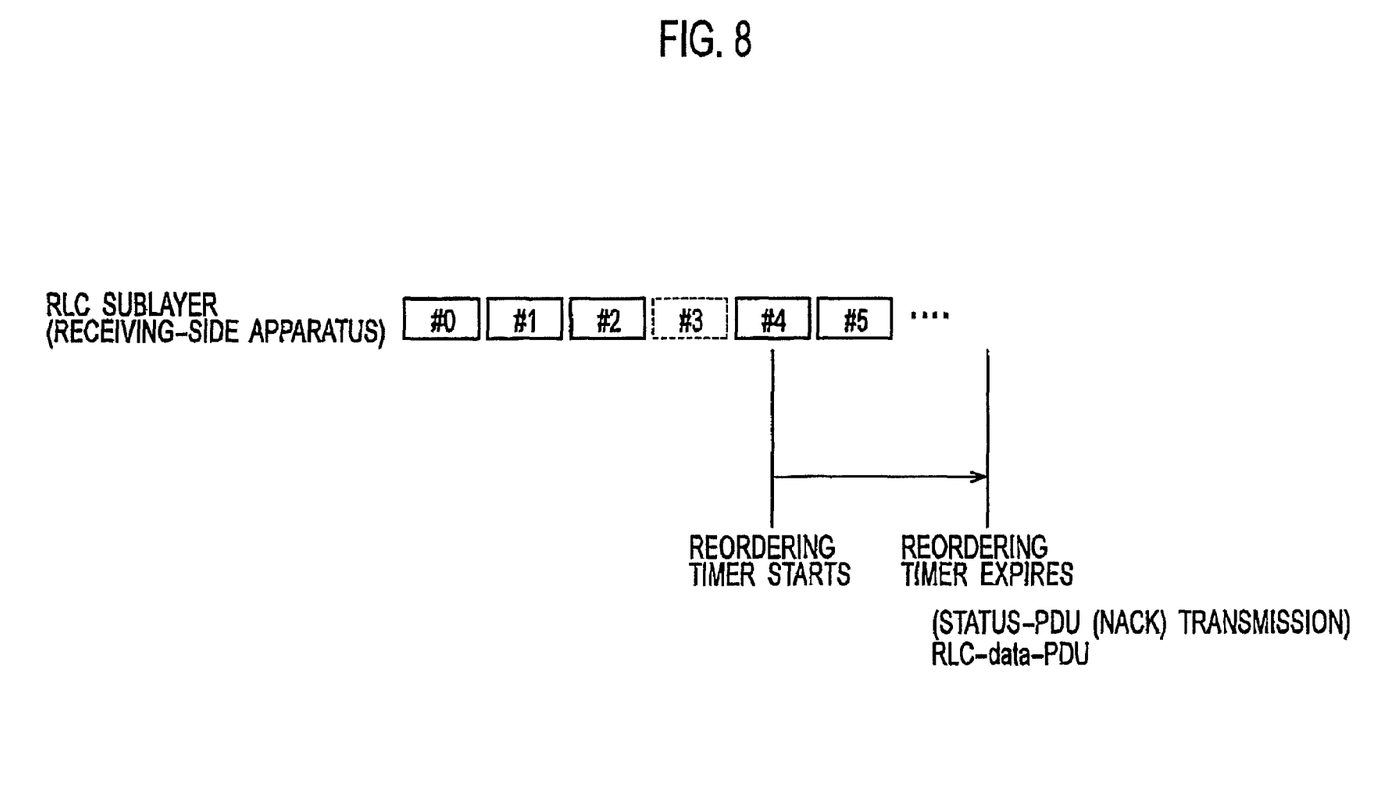
FIG. 8 is a diagram for describing an operation of an RLC sublayer in a mobile station and a radio base station according to the first embodiment of the present invention.

Specifically, as shown in FIG. 8, the reordering buffer 32 is configured to start the reordering timer in a case where the RLC-data-PDU (second packet) with a given sequence number #4 is received before the RLC-data-PDU (first packet) with a given sequence number #3 is received.

Then, in a case where the RLC-data-PDU (first packet) with the given sequence number #3 is not received until the aforementioned reordering timer expires, the reordering buffer 32 determines that a loss of the RLC-data-PDU has occurred (a loss for an unreceived RLC-data-PDU is detected), and then instructs the RLC-control-PDU buffer 20 to transmit a STATUS-PDU (NACK) (retransmission request) for the RLC-data-PDU (first packet) with the given sequence number #3.

In addition, the reordering buffer 32 is configured to start the reordering timer likewise, in a case where the RLC-data-PDU with the given sequence number #4 (second packet) is received before an RLC-data-PDU with a given sequence number #2 and an RLC-data-PDU with a given sequence number #3 (multiple first packets) are received.

Then, in a case where not both of the RLC-data-PDU with the given sequence number #2 and the RLC-data-PDU with the given sequence number #3 (first packet) is received until the aforementioned reordering timer expires, the reordering buffer 32 determines that a loss of the RLC-data-PDU has occurred (a loss for an unreceived RLC-data-PDU is detected), and then instructs the RLC-control-PDU buffer 20 to transmit a STATUS-PDU (NACK) (retransmission request) for the RLC-data-PDU with the given sequence number #2 and/or the RLC-data-PDU with the given sequence number #3 (first packet that has not been received).

Note that, the reordering timer may be configured to be set for each logical channel established between RLC sublayers.

In addition, in a case where the receiving-side apparatus is a mobile station UE, it may be configured that the setting value of the aforementioned reordering timer is notified from a radio base station eNB by an RRC (Radio Resource Control) message.

The reordering buffer 32 is configured to assemble an RLC-data-PDU, in a case where the RLC-data-PDU can be assembled from stored RLC-data-Sub-PDUs.

The RLC-SDU reassembly unit 34 is configured to assemble and then to transmit RLC-SDUs to an upper layer in the order of the sequence numbers, in a case where the RLC-SDUs can be assembled from the RLC-data-PDUs stored in the reassembly buffer 33.

(Operations of Mobile Communication System According to the First Embodiment of the Present Invention)

A description will be given of operations of the receiving-side apparatus in the mobile communication system according to the first embodiment of the present invention with reference to FIG. 9.

Figure 9:
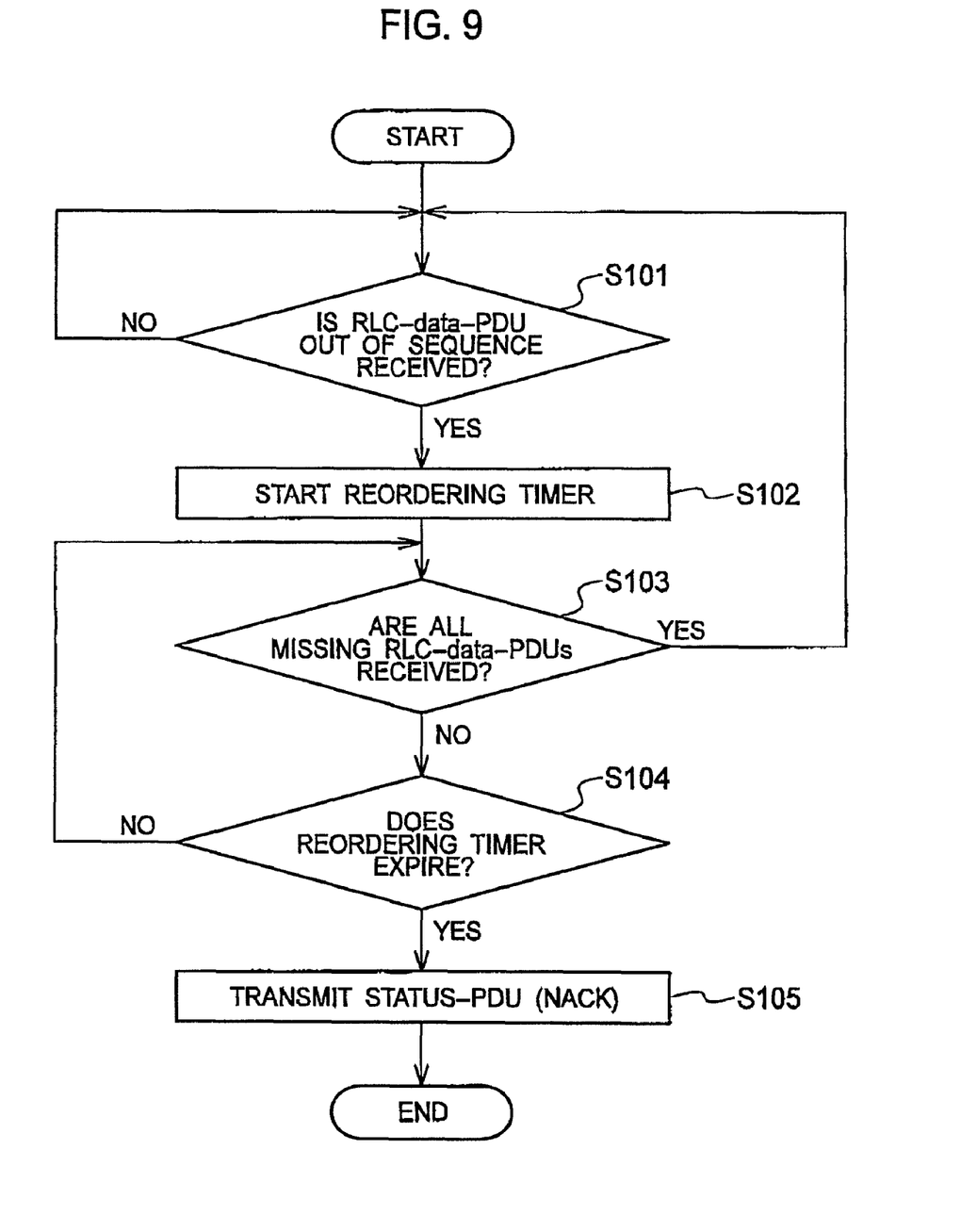
FIG. 9 is a sequence diagram showing operations of the mobile communication system according to the first embodiment of the present invention.

As shown in FIG. 9, in step S101, the RLC sublayer of the receiving-side apparatus determines whether or not an RLC-data-PDU (or RLC-data-Sub-PDU) (for example, the RLC-data-PDU with the sequence number #4 in FIG. 8) not in the order of the sequence numbers (in consideration of modulo operation) is received. Step S101 is repeated herein until it is determined that the RLC-data-PDU not in the order of the sequence numbers is received.

In a case where it is determined that the RLC-data-PDU not in the order of the sequence numbers is received, the RLC sublayer of the receiving-side apparatus starts the reordering timer in step S102.

In step S103, the RLC sublayer of the receiving-side apparatus determines whether or not all the missing RLC-data-PDUs (actually, an RLC-data-PDU in a receive window, which is not received at the time when the RLC-data-PDU not in the order of the sequence numbers is received, and which is, for example, the RLC-data-PDU having the sequence number #3 in FIG. 8) are received.

In a case where it is determined that all of the aforementioned RLC-data-PDUs are received, this operation returns to step S101. In a case where it is determined that all of the aforementioned RLC-data-PDUs are not received, in step S104, the RLC sublayer of the receiving-side apparatus determines whether or not the reordering timer expires.

In a case where it is determined that the reordering timer does not expire, this operation returns to step S103. In a case where it is determined that the reordering timer expires, in step S105, the RLC sublayer of the receiving-side apparatus generates and transmits a STATUS-PDU (NACK) for the RLC-data-PDU that has not been received yet among the missing RLC-data-PDUs.

(Effects and Advantages of the Mobile Communication System According to the First Embodiment of the Present Invention)

In the case of the mobile communication system according to the first embodiment of the present invention, in a case where the MAC sublayer does not perform the reordering processing for received RLC-PDUs, the RLC sublayer can appropriately detect an occurrence of a loss of an RLC-data-PDU (or RLC-data-Sub-PDU) by using the reordering timer and then transmit a STATUS-PDU (NACK) for the unreceived RLC-data-PDU.

MODIFICATION EXAMPLE 1

In the aforementioned first embodiment, the description is given of the mobile communication system in which an RLC sublayer of Acknowledge mode (AM) is used as an example. However, the present invention is not limited to the mobile communication system of this kind, and is applicable to a mobile communication system in which an RLC sublayer of Unacknowledge mode (UM) is used as in the case of a modification example 1.

Hereinafter, a description will be given of a mobile communication system according to the modification example 1 with reference to FIGS. 10 and 11. The description will be given mainly of differences from the mobile communication system according to the aforementioned first embodiment.

Figure 10:
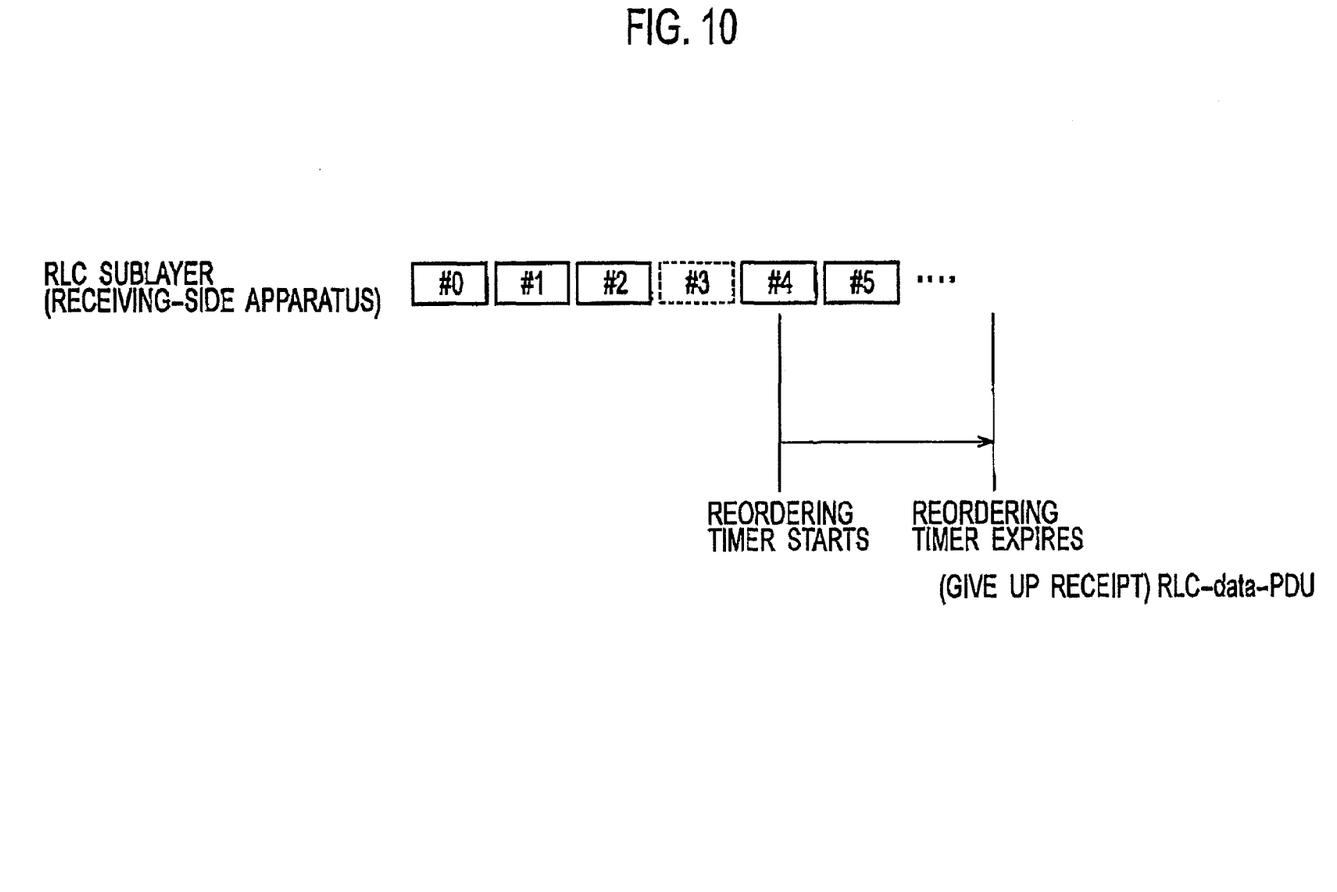
FIG. 10 is a diagram showing an operation of an RLC sublayer in a mobile station and a radio base station according to the first embodiment of the present invention.

As shown in FIG. 10, the reordering buffer 32 is configured to start the reordering timer, in a case where the RLC-data-PDU (second packet) with the given sequence number #4 is received before the RLC-data-PDU (first packet) with the given sequence number #3 is received.

Then, the reordering buffer 32 is configured to determine that a loss of the RLC-data-PDU has occurred (a loss in an unreceived RLC-data-PDU is detected), in a case where the RLC-data-PDU (first packet) with the given sequence number #3 is not received until the aforementioned reordering timer expires. The reordering buffer 32 is configured to then determine that there is no chance to receive the RLC-data-PDU (first packet) with the given sequence number #3, that is, to give up receiving of the RLC-data-PDU (first packet) packet with the given sequence number #3.

Furthermore, when giving up the receiving of the RLC-data-PDU (first packet) with the given sequence number #3, the reordering buffer 32 performs an operation to advance the receive window by setting the lower limit value of the receive window to be a value larger than the sequence number of the RLC-data-PDU (first packet), the receiving of which has been given up. In a case where a sequence number of already received RLC-data-PDU becomes outside the receive window after this operation is performed, the already received RLC-data-PDU is stored in a reassembly buffer.

In addition, the reordering buffer 32 is configured to start the reordering timer likewise, in a case where the RLC-data-PDU (second packet) with the given sequence number #4 is received before an RLC-data-PDU with a given sequence number #2 and an RLC-data-PDU packet with a given sequence number #3 (multiple first packets) are received.

Then, the reordering buffer 32 is configured to determine that a loss of the RLC-data-PDU has occurred (a loss for an unreceived RLC-data-PDU is detected), and then to determine that there is no chance to receive the RLC-data-PDU with the given sequence number #2 and/or the RLC-data-PDU with the given sequence number #3 (unreceived first packets), in a case where not both of the RLC-data-PDU with the given sequence number #2 and the RLC-data-PDU with the given sequence number #3 (first packets) is received until the aforementioned reordering timer expires. Specifically, the reordering buffer 32 is configured to give up receiving of the RLC-data-PDU with the given sequence number #2 and/or the RLC-data-PDU packet with the given sequence number #3 (first packets) in this case.

Moreover, when giving up the receiving of the RLC-data-PDUs packet with the given sequence numbers #2 and #3 (first packets), the reordering buffer 32 performs an operation to advance the receive window by setting the lower limit value of the receive window to be a value larger than the sequence numbers of the RLC-data-PDUs (first packets), the receiving of which have been given up. In a case where a sequence number of already received RLC-data-PDU becomes outside the receive window after this operation is performed, the already received RLC-data-PDU is stored in a reassembly buffer.

Figure 11:
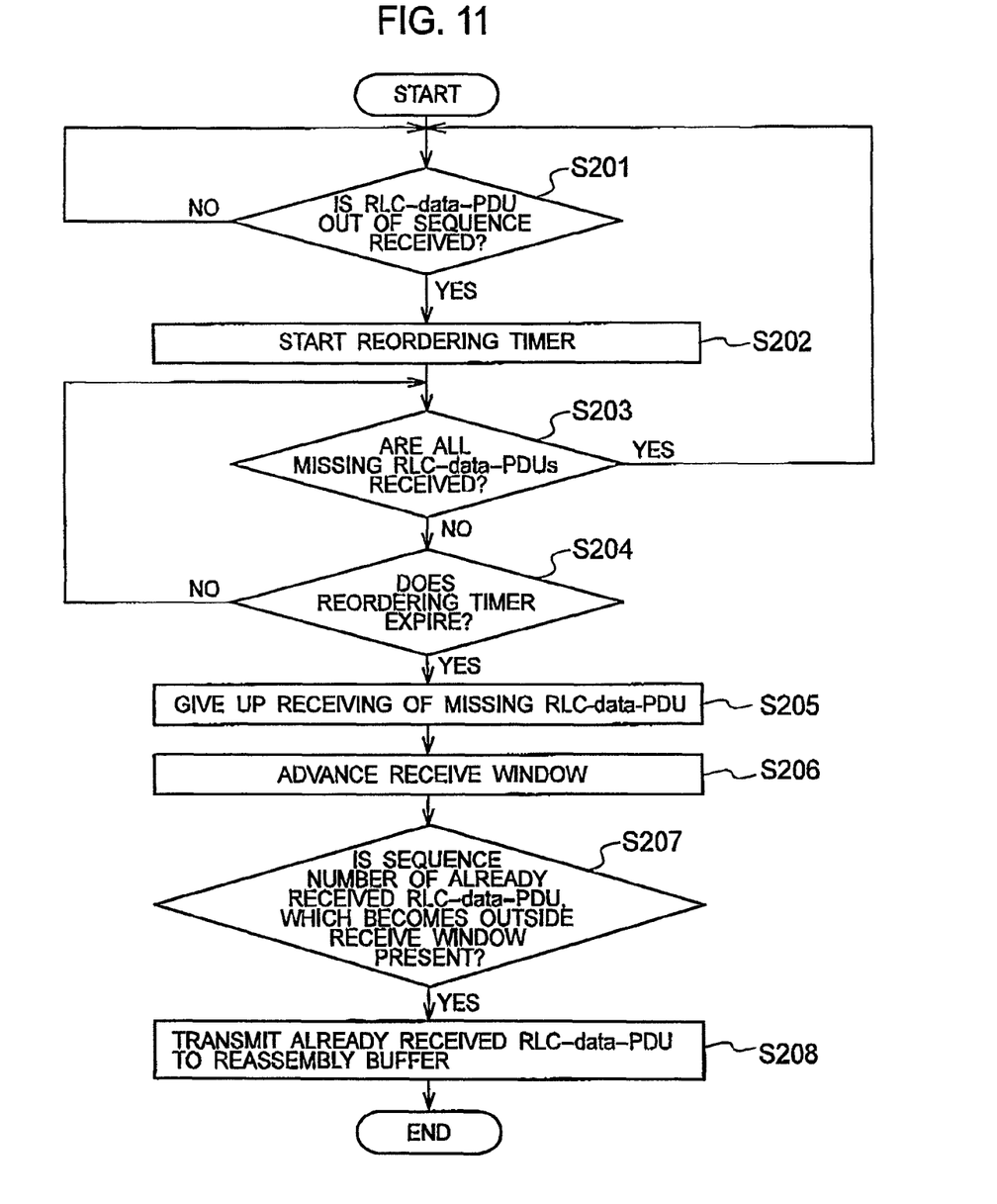
FIG. 11 is a flowchart showing operations of an RLC sublayer in a mobile station and a radio base station according to a modification example 1 of the present invention.

With reference to FIG. 11, a description will be given of operations of the receiving-side apparatus of the mobile communication system according to the modification example 1. Operations in steps S201 to S204 are the same as those in steps S101 to S104 shown in FIG. 9.

In step S205, the RLC sublayer of the receiving-side apparatus determines that there is no chance to receive the RLC-data-PDU that has not been received yet among the missing RLC-data-PDUs and gives up receiving of the RLC-data-PDU (that is, abandons the receiving thereof). Then, the RLC sublayer of the receiving-side apparatus performs an operation in step S206.

In step S206, the RLC sublayer of the receiving-side apparatus sets the lower limit value of the receive window to be a value larger than the sequence number of the RLC-data-PDU, the receiving of which has been given up.

In step S207, the RLC sublayer of the receiving-side apparatus determines the presence or absence of an already received RLC-data-PDU whose sequence number becomes outside the receive window.

In a case where it is determined that an already received RLC-data-PDU whose sequence number becomes outside the receive window is present, in step S208, the RLC sublayer of the receiving-side apparatus considers this RLC-data-PDU as a target for reassembling an RLC-SDU.

(Other Embodiments)

The present invention is not limited to the aforementioned embodiment, and various modifications are possible. For example, the RLC sublayer of the receiving-side apparatus may be configured to determine which one of Acknowledge mode (AM) and Unacknowledge mode (UM) is set, and then to transmit a STATUS-PDU in accordance with the result of the determination.

Specifically, when determining that the reordering timer expires (YES in step S104 in FIG. 9 or YES in step S204 in FIG. 11), the RLC sublayer of the receiving-side apparatus determines which one of Acknowledge mode (AM) and Unacknowledge mode (UM) is set.

Moreover, the RLC sublayer of the receiving-side apparatus may be configured to transmit a STATUS-PDU (NACK) (step S105 in FIG. 9), in a case where the RLC sublayer of the receiving-side apparatus determines that Acknowledge mode (AM) is set, and to determine that there is no chance to receive the RLC-data-PDU that has not been received yet among missing RLC-data-PDUs, in a case where the RLC sublayer of the receiving-side apparatus determines that Unacknowledge mode (UM) is set, and to give up (abandon) the receiving of the RLC-data-PDU (step S205 in FIG. 11).

The present invention has been described above by using the aforementioned embodiments. However, it is obvious to those skilled in the art that the present invention is not limited to the embodiments described in this description. The present invention can be implemented as a revised and modified form without departing from the spirit and scope of the present invention, which are defined by the appended claims. Thus, the contents of this description aim to describe the exemplification and not to impose any limitation on the present invention.

Note that, the entire contents of Japanese Patent Application No. 2007-101193 (filed on Apr. 6, 2007) are incorporated in this description by reference.

Industrial Applicability

As described above, the packet communication method and the receiving-side apparatus according to the present invention are advantageous because the RLC sublayer can appropriately detects an occurrence of a packet loss in a case where the MAC sublayer does not perform reordering processing for received RLC-PDUs.

The invention claimed is:

1. A packet communication method in which a predetermined sublayer of a transmitting-side apparatus transmits a packet with a given sequence number to a predetermined sublayer of a receiving-side apparatus, the method comprising the steps of:

starting, at the predetermined sublayer of the receiving-side apparatus, a reordering timer, when receiving a second packet before receiving a first packet in a case where a sequence number of the first packet is smaller than a sequence number of the second packet; and transmitting, at the predetermined sublayer of the receiving-side apparatus, a retransmission request for the first packet, when not receiving the first packet until the reordering timer expires.

2. The packet communication method according to claim 1, wherein the predetermined sublayer of the receiving-side apparatus starts the reordering timer, when receiving the second packet before receiving a plurality of the first packets; and the predetermined sublayer of the receiving-side apparatus transmits a retransmission request for the unreceived first packet, when not receiving all of the plurality of the first packets until the reordering timer expires.

3. The packet communication method according to claim 1, wherein the first and second packets are transmitted via a logical channel established between the predetermined sublayer of the transmitting-side apparatus and the predetermined sublayer of the receiving-side apparatus; and the reordering timer is set for each of the logic channels.

4. The packet communication method according to claim 1, wherein the receiving-side apparatus is notified of a setting value of the reordering timer by an RRC (Radio Resource Control) message.

5. A packet communication method in which a predetermined sublayer of a transmitting-side apparatus transmits a packet with a given sequence number to a predetermined sublayer of a receiving-side apparatus, the method comprising the steps of:

starting, at the predetermined sublayer of the receiving-side apparatus, a reordering timer, when receiving a second packet before receiving a first packet in a case where a sequence number of the first packet is smaller than a sequence number of the second packet; and determining, at the predetermined sublayer of the receiving-side apparatus, that there is no chance to receive the first packet, when not receiving the first packet until the reordering timer expires; wherein the first and second packets are transmitted via a logical channel established between the predetermined sublayer of the transmitting-side apparatus and the predetermined sublayer of the receiving-side apparatus; and the reordering timer is set for each of the logic channels.

6. The packet communication method according to claim 5, wherein the predetermined sublayer of the receiving-side apparatus starts the reordering timer, when receiving the second packet before receiving a plurality of the first packets; and the predetermined sublayer of the receiving-side apparatus determines that there is no chance to receive the unreceived first packet, when not receiving all of the plurality of the first packets until the reordering timer expires.

7. The packet communication method according to claim 5, wherein the predetermined sublayer of the receiving-side apparatus manages a receive window that defines an upper limit value and a lower limit value of a sequence number of a receivable packet; and the predetermined sublayer of the receiving-side apparatus sets the lower limit value of the receive window to a value larger than the sequence number of the first packet, when determining that there is no chance to receive the first packet.

8. The packet communication method according to claim 5, wherein the receiving-side apparatus is notified of a setting value of the reordering timer by an RRC (Radio Resource Control) message.

9. A receiving-side apparatus configured to receive a packet with a given sequence number from a predetermined sublayer of a transmitting-side apparatus, wherein the predetermined sublayer of the receiving-side apparatus is configured to start a reordering timer, when receiving a second packet before receiving a first packet in a case where a sequence number of the first packet is smaller than a sequence number of the second packet; and the predetermined sublayer of the receiving-side apparatus is configured to transmit a retransmission request for the first packet, when not receiving the first packet until the reordering timer expires.

10. The receiving-side apparatus according to claim 9, wherein
- the predetermined sublayer of the receiving-side apparatus is configured to start the reordering timer, when receiving the second packet before receiving a plurality of the first packets, and
- the predetermined sublayer of the receiving-side apparatus is configured to transmit a retransmission request for the unreceived first packet, when not receiving all of the plurality of the first packets until the reordering timer expires.

11. The receiving-side apparatus according to claim 9, wherein
- the first and second packets are configured to be transmitted via a logical channel established with the predetermined sublayer of the transmitting-side apparatus, and
- the reordering timer is configured to be set for each of the logic channels.

12. The receiving-side apparatus according to claim 9, wherein
- a setting value of the reordering timer is notified by an RRC (Radio Resource Control) message.

13. A receiving-side apparatus configured to receive a packet with a given sequence number from a predetermined sublayer of a transmitting-side apparatus, wherein
- the predetermined sublayer of the receiving-side apparatus is configured to start a reordering timer, when receiving a second packet before receiving a first packet in a case where a sequence number of the first packet is smaller than a sequence number of the second packet;
- the predetermined sublayer of the receiving-side apparatus is configured to determine that there is no chance to receive the first packet when not receiving the first packet until the reordering timer expires;
- the first and second packets are configured to be transmitted via a logical channel established with the predetermined sublayer of the transmitting-side apparatus; and
- the reordering timer is configured to be set for each of the logic channels.

14. The receiving-side apparatus according to claim 13, wherein
- the predetermined sublayer of the receiving-side apparatus is configured to start the reordering timer, when receiving the second packet before receiving a plurality of the first packets; and
- the predetermined sublayer of the receiving-side apparatus is configured to determine that there is no chance to receive the unreceived first packet, when not receiving all of the plurality of the first packets until the reordering timer expires.

15. The receiving-side apparatus according to claim 13, wherein
- the predetermined sublayer of the receiving-side apparatus is configured to manage a receive window that defines an upper limit value and a lower limit value of a sequence number of a receivable packet; and
- the predetermined sublayer of the receiving-side apparatus is configured to set the lower limit value of the receive window to a value larger than the sequence number of the first packet, when determining that there is no chance to receive the first packet.

16. The receiving-side apparatus according to claim 13, wherein
- a setting value of the reordering timer is notified by an RRC (Radio Resource Control) message.

17. The packet communication method according claim 2, wherein
- the first and second packets are transmitted via a logical channel established between the predetermined sublayer of the transmitting-side apparatus and the predetermined sublayer of the receiving-side apparatus; and
- the reordering timer is set for each of the logic channels.

18. The packet communication method according to claim 2, wherein
- the receiving-side apparatus is notified of a setting value of the reordering timer by an RRC (Radio Resource Control) message.

19. The packet communication method according to claim 3, wherein
- the receiving-side apparatus is notified of a setting value of the reordering timer by an RRC (Radio Resource Control) message.

20. The packet communication method according to claim 6, wherein
- the predetermined sublayer of the receiving-side apparatus manages a receive window that defines an upper limit value and a lower limit value of a sequence number of a receivable packet; and
- the predetermined sublayer of the receiving-side apparatus sets the lower limit value of the receive window to a value larger than the sequence number of the first packet, when determining that there is no chance to receive the first packet.

21. The packet communication method according to claim 6, wherein
- the receiving-side apparatus is notified of a setting value of the reordering timer by an RRC (Radio Resource Control) message.

22. The packet communication method according to claim 7, wherein
- the receiving-side apparatus is notified of a setting value of the reordering timer by an RRC (Radio Resource Control) message.

23. The receiving-side apparatus according to claim 10, wherein
- the first and second packets are configured to be transmitted via a logical channel established with the predetermined sublayer of the transmitting-side apparatus, and
- the reordering timer is configured to be set for each of the logic channels.

24. The receiving-side apparatus according to claim 10, wherein
- a setting value of the reordering timer is notified by an RRC (Radio Resource Control) message.

25. The receiving-side apparatus according to claim 11, wherein
- a setting value of the reordering timer is notified by an RRC (Radio Resource Control) message.

26. The receiving-side apparatus according to claim 14, wherein
- the predetermined sublayer of the receiving-side apparatus is configured to manage a receive window that defines an upper limit value and a lower limit value of a sequence number of a receivable packet; and
- the predetermined sublayer of the receiving-side apparatus is configured to set the lower limit value of the receive window to a value larger than the sequence number of the first packet, when determining that there is no chance to receive the first packet.

27. The receiving-side apparatus according to claim 14, wherein
- a setting value of the reordering timer is notified by an RRC (Radio Resource Control) message.

28. The receiving-side apparatus according to claim 15, wherein
- a setting value of the reordering timer is notified by an RRC (Radio Resource Control) message.

* * * * *